Patented May 24, 1938

2,118,728

UNITED STATES PATENT OFFICE 2,118,728

PROCESS OF AND APPARATUS FOR POLYMERIZING OILS

James C. Harris, Jr. and George Sutherland, Baltimore, Md.

Application November 4, 1935, Serial No. 48,240

11 Claims. (Cl. 87—12)

This invention relates to a process of and apparatus for polymerizing vegetable or animal oils capable of polymerization or thickening on the application of heat and, among other objects, aims to provide a greatly improved method of automatically maintaining a closed atmosphere of inert gas over a batch of oil being treated and regulating the application of heat to the batch to prevent overheating the oil. Also, the invention aims to provide a method of extracting some of the heat from the oil after the exothermic reaction has begun, to prevent the temperature of the oil from rising above the final polymerization temperature. Furthermore, the invention contemplates improved apparatus for practicing the method, the main idea being to provide relatively simple and reliable equipment for producing high grade thickened oils while minimizing the possibility of fire.

Figure 1:
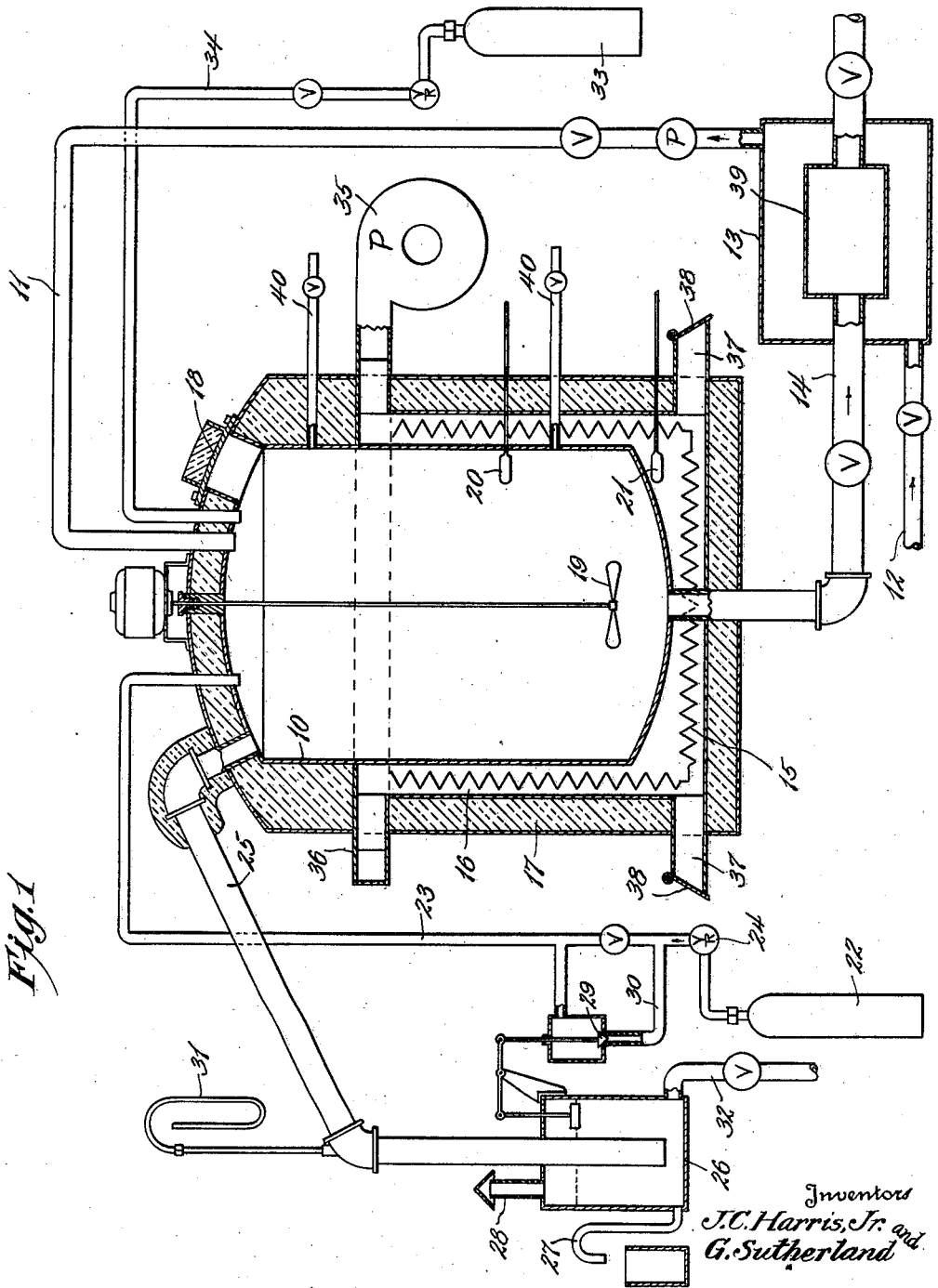
Figure 2:
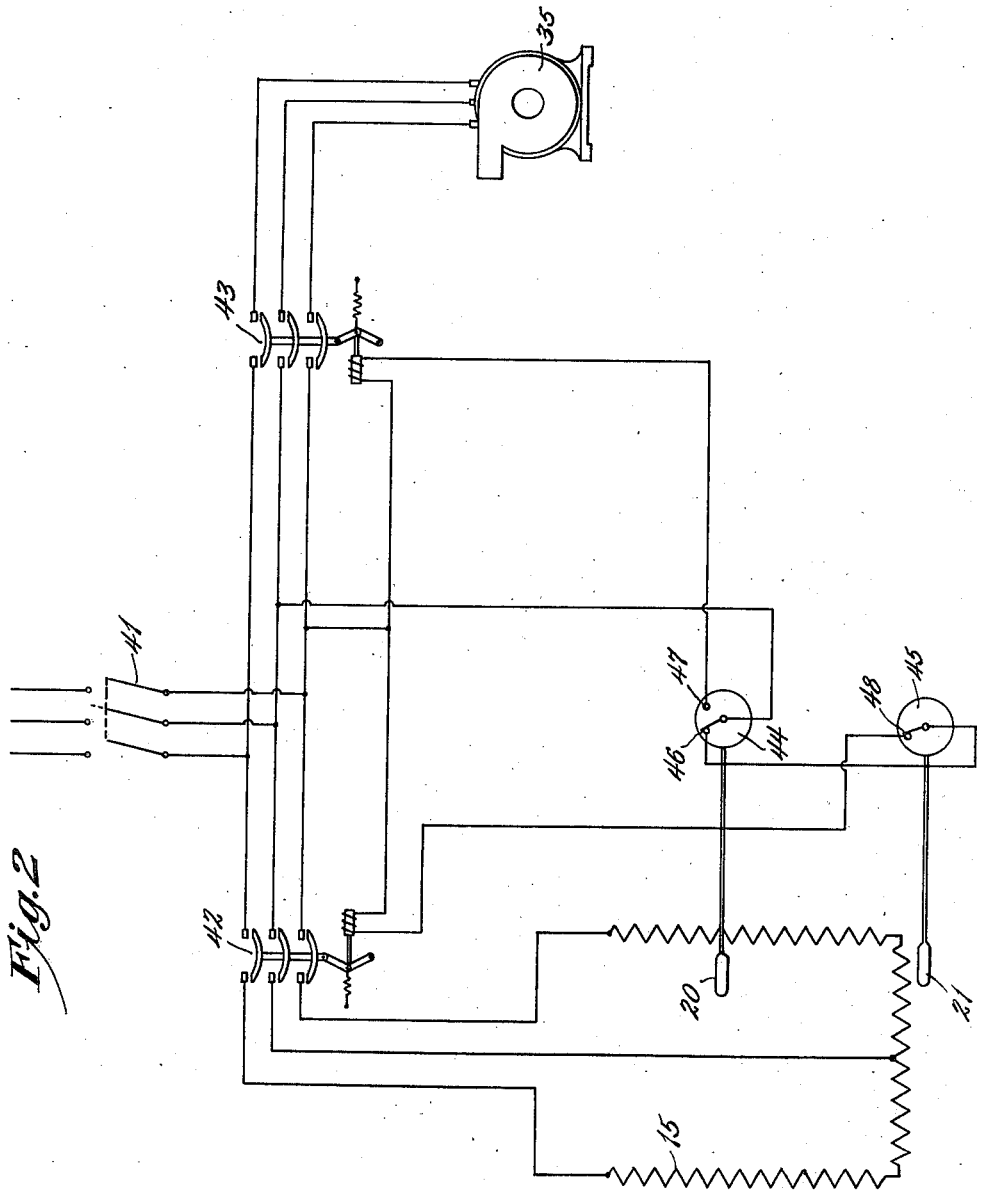

Other aims and advantages of the invention will appear in the specification, when considered in connection with one illustrative embodiment of apparatus for practicing the method, wherein:

Fig. 1 is a sectional view partly in elevation showing an example of apparatus for practicing the method; and Fig. 2 is an electrical wiring diagram showing control devices for the apparatus.

Referring particularly to the drawings, the illustrative apparatus shown embodies a closed kettle 10 which is adapted to be partially filled with oil to be treated, conveniently, by means of a pipe 11 connected to the discharge side of a pump P and controlled by a valve V. The oil is conveniently delivered from a storage tank (not shown), through a valved pipe or conduit 12 and a heat exchanger 13 around a portion of a discharge pipe 14 leading from the bottom of the kettle.

In this instance, the kettle is adapted to be heated electrically by means of resistance coils 15 around the bottom portion of the kettle arranged in a heating chamber 16 formed by an insulating jacket or wall 17. The top of the kettle is shown as having a manhole cover 18 to afford access to the interior of the kettle. While the heat is being applied, the oil is agitated or stirred by means of a motor driven agitator or propeller 19 preferably arranged near the bottom of the kettle.

The application of heat is shown as being controlled by two thermostats 20 and 21 within the kettle and in the heating space 16, respectively, the thermostat 20 being adapted to cut off the current or open a switch automatically when the oil is raised to a predetermined temperature, which it is desired to maintain during the bodying operation. Also, the thermostat 21 is adapted to open and close the switch automatically to maintain the temperature within the heating chamber at a predetermined maximum, below which the transfer of heat to the oil is not sufficiently rapid to cause carbonization and discoloring of the oil due to local overheating. It is desirable to maintain the temperature difference between the heating chamber and the oil as low as possible without unduly prolonging the heating up period. In practicing the method, a temperature difference of 250° when the oil reaches its bodying temperature has produced excellent results.

It is usually necessary to maintain an atmosphere of inert gas above the oil to prevent an explosion which would otherwise occur if air is permitted to enter the kettle and mix with the oil vapor at a high temperature. For this purpose, there is shown a source of inert gas, such as carbon dioxide, in the form of a tank or drum 22 having a conduit 23 leading to the top of the kettle and provided with the usual pressure reducing valve 24, it being understood that the carbon dioxide is usually under a high pressure. When the gas is initially admitted to the kettle, the valves in all of the conduits, except conduit 25, are closed. It is admitted through a hand valve V, as shown and, therefter, the pressure is controlled automatically both while the heat is being applied to and the oil is being discharged from the kettle. In this instance, the absolute pressure of the gas is controlled by a liquid seal and float valve operated thereby. There is shown a conduit 25 leading from the top of the kettle downwardly into a small float chamber 26 which is arranged several feet below the level of the oil in the kettle. This pipe is partially exposed to the air so that any oil vapor present in the escaping gas will be condensed. The lower end of the pipe is submerged to a predetermined depth in the liquid within the tank 26 so that the excess gas has to bubble through it. The depth of submergence determines the pressure of gas in the kettle necessary to cause any gas to escape. The normal level of the oil in the float chamber is automatically maintained by an overflow pipe 27. Also, the chamber has a vent 28 to permit any trapped gases therein to escape. A float valve 29 of any conventional construction arranged in a by-pass conduit 30 connected to the gas line 23, is controlled by the level of the oil in the chamber.

Assuming that the kettle is filled with oil to the desired level and is being heated after the carbon dioxide is initially charged into it through the hand valve, the pressure of the gas will be maintained automatically by the float valve 29. If, for any reason, the absolute pressure of the gas in the kettle should be reduced below that required to overcome the static pressure of the liquid in the float chamber above the end of the conduit 25 and there is danger of air entering the kettle, some of the oil in the chamber 26 will enter conduit 25, thereby lowering the level of the oil in the chamber. The float will then open and permit more carbon dioxide to flow into the kettle until the pressure is restored. As long as the float valve 29 is closed, the excess carbon dioxide and oil fumes, at a pressure exceeding the hydrostatic head of the liquid in the float chamber 26 above the lower end of conduit 25, will escape through the conduit and bubble through the liquid in the tank without affecting the float valve. The pressure of the gas may be observed at all times by means of an ordinary manometer 31 connected to the conduit 25. Moreover, the liquid in the float chamber 26 may be drained periodically through a valved drain 32 and replenished to avoid accumulation to too much sediment or water in the bottom of the chamber.

To insure an abundant supply of inert gas and, in case of an emergency, to prevent fire or an explosion, there is shown an emergency tank or drum 33 of gas connected to the kettle by a conduit 34 having the usual pressure reducing valve and hand valve as shown.

After the batch of oil is heated to a temperature at which the exothermic reaction begins, the automatic control equipment is adapted to cut off the current. Since the heat generated by the chemical reaction in the oil causes the temperature to rise very rapidly and, oftentimes, considerably above the final desired polymerization temperature, it is highly desirable to provide means for arresting this temperature rise at or near the desired temperature by artificially extracting the heat from the kettle. In this instance, heat is extracted by means of circulating air within the heating chamber. Air is discharged through the jacket by a motor operated fan or air pump 35 connected at spaced points to the jacket by means of a manifold 36 and the air or other cooling medium is discharged from the bottom portion of the jacket through spaced conduits 37, each having a pivoted valve or damper 38 adapted to be opened by the pressure of the air.

The operation of the fan or air pump is automatically controlled by the thermostat 20 in the oil bath or kettle. The arrangement is such that after the thermostat opens the circuit to the heater and when the exothermic reaction has further raised the oil to a temperature above that at which it is desired to maintain the oil, this thermostat automatically starts the fan, which rapidly extracts the excess heat generated by the chemical reaction. When the temperature is reduced to the working temperature, the thermostat cuts off the blower. This operation automatically repeats itself, at less frequent intervals, as the polymerization progresses. If the polymerization is carried sufficiently far, the exothermic heat may become less than the normal heat losses from the apparatus, in which case the thermostat 20 will again operate to turn on the heat to maintain the operating temperature.

When the polymerization is completed or after the oil has been heated to the required temperature for the desired time, it is discharged into storage containers (not shown) through the outlet pipe 14 and gives up some of its heat when it passes through a tank 39 in heat exchanging relation with the incoming oil in the heat exchanger 13. The entire batch of oil is removed before new oil is again pumped into the kettle and, while the oil is being removed, carbon dioxide or the inert gas is continuously delivered to the kettle to maintain the absolute pressure above atmospheric pressure and avoid fire. It is very essential to prevent the ingress of air into the kettle while it is being discharged. When the kettle is being refilled, the fresh oil is sprayed on the kettle walls to wash down traces of the previous batch and thereby prevent carbonization and consequent baking on the walls. The level of the oil may be determined by a series of valved pipes or petcocks 40 arranged at different levels, as shown.

Referring to the simplified wiring diagram shown in Fig. 2, it will be noted that the electrical heating elements 15 and the motor M for driving the fan or blower 35 are connected to a three-phase circuit by means of a hand switch 41. A pair of magnetic relay switches 42 and 43 control the heater and the motor, respectively, and are operated by the thermostats 20 and 21 having thermostat controlled switches 44 and 45, respectively. The thermostat switch 44 has two contacts 46 and 47; while the thermostat switch 45 has one contact 48. Both of the contacts 46 and 48 are connected in series to control the magnetic switch 42, so that either thermostat will operate its switch when the temperature in the heating jacket or in the bath exceeds the predetermined maximum for which it is set, and cause the magnetic switch to break the heater circuit. After the thermostat 20 breaks this circuit and the temperature rises sufficiently to close the contact 47, it will operate the magnetic switch 43 to close the fan motor circuit. It will be understood that the thermostat switches may be of any conventional form and may be adjusted to be operated at any desired temperatures. All of this switch controlling mechanism will conveniently be arranged on a panel in conjunction with the ordinary electrical instruments used for such purposes.

From the foregoing description, it will be understood that the improved method provides a very safe and reliable mode of polymerizing oils and is eminently adapted for the treatment of vegetable oils, such as linseed oil, to produce a superior commercial product. It is also applicable to unsaturated oils other than linseed oil and to such oils admixed with other substances, such as resin and the like. Furthermore, the preferred form of apparatus for practicing the method is relatively simple, reliable and economical in operation. It insures a high heating efficiency and prevents overheating the oil. Likewise, it reduces the hazard of fire or explosions to a minimum.

Obviously, the invention is not restricted to the particular apparatus illustrated for practicing the method; but said apparatus is capable of various embodiments. Moreover, it is not indispensable that all parts of the apparatus shall be used conjointly, but they are capable of embodiment in various combinations and sub-combinations.

What is claimed is:

1. The process of polymerizing oil which is characterized by heating a batch of the oil in a closed kettle; automatically maintaining the temperature difference between the source of heat and the oil below a predetermined maximum to prevent carbonization of the oil; automatically cutting off the supply of heat when the oil has reached the polymerizing temperature; artificially cooling the oil to extract excess heat due to the exothermic reaction in the oil after the supply of heat has been cut off; and maintaining an atmosphere of inert gas above the oil throughout the treatment.

2. Apparatus for polymerizing oil comprising, in combination, a closed kettle having a spaced insulating jacket providing a heating chamber; heating means in the said heating chamber; a thermostat in the air space within the heating chamber connected to control said heating means and thereby control the temperature of the air in the heating chamber; automatic means to maintain an atmosphere of inert gas above the oil level; a thermostat in the oil bath in the kettle; and cooling means controlled by said last named thermostat to extract some of the heat from the oil after the exothermic chemical reaction has begun.

3. Apparatus for polymerizing oil comprising, in combination, a closed kettle; heating means for the kettle; means to supply inert gas under pressure connected to the kettle above the normal oil level; a conduit for discharging excess gas connected to the top of the kettle and extending downwardly outside of the kettle; a float chamber carrying a liquid in which the lower end of the conduit is submerged to a predetermined depth; and a float valve connected to control the supply of inert gas to the kettle.

4. Apparatus for polymerizing oil comprising, in combination, a closed kettle; a heating chamber around the kettle; heating means in said chamber; a thermostat in the chamber connected to control the supply of heat and prevent the temperature in the chamber from exceeding a predetermined maximum; a thermostat in the kettle connected to cut off the supply of heat when the oil reaches a predetermined temperature; and a blower connected to deliver cooling air through the chamber controlled by the thermostat in the kettle and connected to be started automatically after said thermostat cuts off the supply of heat to extract some of the excess heat due to the exothermic chemical reaction of the oil and thereby prevent the oil from overheating.

5. Apparatus for polymerizing oil comprising, in combination, a closed kettle; heating means for the kettle; a source of inert gas under pressure communicating with the top of the kettle; a gas conduit leading from the top of the kettle downwardly on the outside of the kettle to a point below the normal oil level; a chamber carrying a liquid in which the lower end of said gas conduit is submerged; and a valve for delivering gas to the kettle controlled by the level of the liquid in said chamber and adapted to be opened automatically when the gas pressure in the kettle decreases sufficiently to permit some of the liquid to enter the submerged end of the gas conduit and thereby lower the liquid level in said chamber.

6. Polymerizing apparatus of the character described comprising, in combination, a kettle; external heating means for the kettle; heat responsive means adjacent to the outside of the kettle and exposed to the temperature of the heat-transferring medium, a control device operable by said heat responsive means connected to control the heating means and thereby prevent the temperature of the heat-transferring medium from exceeding a predetermined maximum above which the rate of heat transfer would be excessive; control means responsive to the temperature of the charge in the kettle connected to cut off the supply of heat automatically when the charge is heated to a predetermined polymerizing temperature; and external cooling means operable in response to rises in the temperature of the charge above a predetermined maximum.

7. Apparatus for polymerizing oil comprising, in combination, a kettle; external heating means for the kettle; control means responsive to the temperature of the oil in the kettle connected to cut off the supply of heat when the oil reaches the desired temperature; and external cooling means also connected to said control means and rendered operative in response to abnormal rises in the temperature of the oil due to the exothermic chemical reaction.

8. That method of polymerizing a charge of oil in a kettle which is characterized by initially heating the oil to approximately a polymerizing temperature; maintaining the temperature of the heating medium below that at which local over-polymerization occurs; utilizing the heat generated in the oil by the exothermic chemical reaction to maintain the polymerizing temperature of the oil while the polymerization progresses; and automatically maintaining the polymerizing temperature of the entire charge of oil substantially constant by extracting externally the excessive heat due to the exothermic reaction and also automatically adding external heat when the exothermic heat is insufficient to maintain the constant temperature.

9. The process of polymerizing oil which is characterized by heating a batch of the oil in a kettle; automatically maintaining the temperature difference between the source of heat and the oil below a predetermined maximum to prevent carbonization of the oil; automatically cutting off the supply of heat when the oil has reached the polymerizing temperature; and automatically cooling the kettle to extract excess heat from the oil due to the exothermic reaction in the oil after the supply of heat has been cut off.

10. The process of polymerizing oil which is characterized by heating a batch of the oil in a closed kettle and in the presence of an inert gas; automatically cutting off the supply of heat when the oil reaches a predetermined polymerization temperature; cooling the entire batch of oil by bringing a separate cooling medium into heat exchange relation with the kettle; and controlling the application of the cooling medium also in response to the temperature of the oil to prevent overheating of the oil due to the exothermic chemical reaction.

11. That method of polymerizing a charge of oil in a closed kettle which is characterized by initially heating the oil to approximately a polymerizing temperature; maintaining the temperature of the heating medium below that at which local over-polymerization occurs; cutting off the applied heat after the temperature is raised; utilizing the heat generated in the oil by the exothermic chemical reaction to maintain the polymerizing temperature of the oil while the polymerization progresses; and automatically applying a cooling medium in response to an abnormal rise in the temperature of the charge while the polymerization is progressing, to maintain the temperature of the charge substantially constant.

JAMES C. HARRIS, Jr.
GEORGE SUTHERLAND.